United States Patent [19]

Thomas et al.

[11] Patent Number: 4,644,203
[45] Date of Patent: Feb. 17, 1987

[54] GENERATOR ASSEMBLY WITH TORQUE BALANCING GENERATION

[76] Inventors: Stephen E. Thomas, 4015 Heron Pl., Fremont, Calif. 94536; Mark S. Thomas, 3770 Flora Vista, Santa Clara, Calif. 95051

[21] Appl. No.: 824,594

[22] Filed: Jan. 31, 1986

[51] Int. Cl.[4] .......................... H02K 7/02; F03B 13/12
[52] U.S. Cl. .................................... 310/67 A; 290/53; 310/112
[58] Field of Search ................. 310/67 A, 67 R, 68 B, 310/83, 99, 112; 290/53

[56] References Cited

U.S. PATENT DOCUMENTS

| | | | |
|---|---|---|---|
| 3,231,749 | 1/1966 | Hinck, III | 290/53 |
| 4,229,728 | 10/1980 | Tremba | 310/68 B |
| 4,266,143 | 5/1981 | NG | 290/53 |
| 4,282,443 | 8/1981 | Seidl | 310/112 |
| 4,539,496 | 9/1985 | Thomas et al. | 310/67 A |

FOREIGN PATENT DOCUMENTS

| | | | |
|---|---|---|---|
| 701355 | 1/1941 | Fed. Rep. of Germany | 310/67 A |
| 993570 | 11/1951 | France | 310/67 A |
| 260766 | 3/1949 | Switzerland | 310/67 A |

*Primary Examiner*—Patrick R. Salce
*Assistant Examiner*—D. L. Rebsch

[57] ABSTRACT

A generator assembly characterized by a pair of plates driven in opposite directions, and a pair of generators each engaged with one of the rotating plates. The generators are attached to a generator support bearing supported by a central shaft that is rigidly attached to a first plate and which is rotatably coupled to a second plate. A third plate and a drive gear are used to rotate the second plate in a direction opposite to that of the first plate.

15 Claims, 5 Drawing Figures

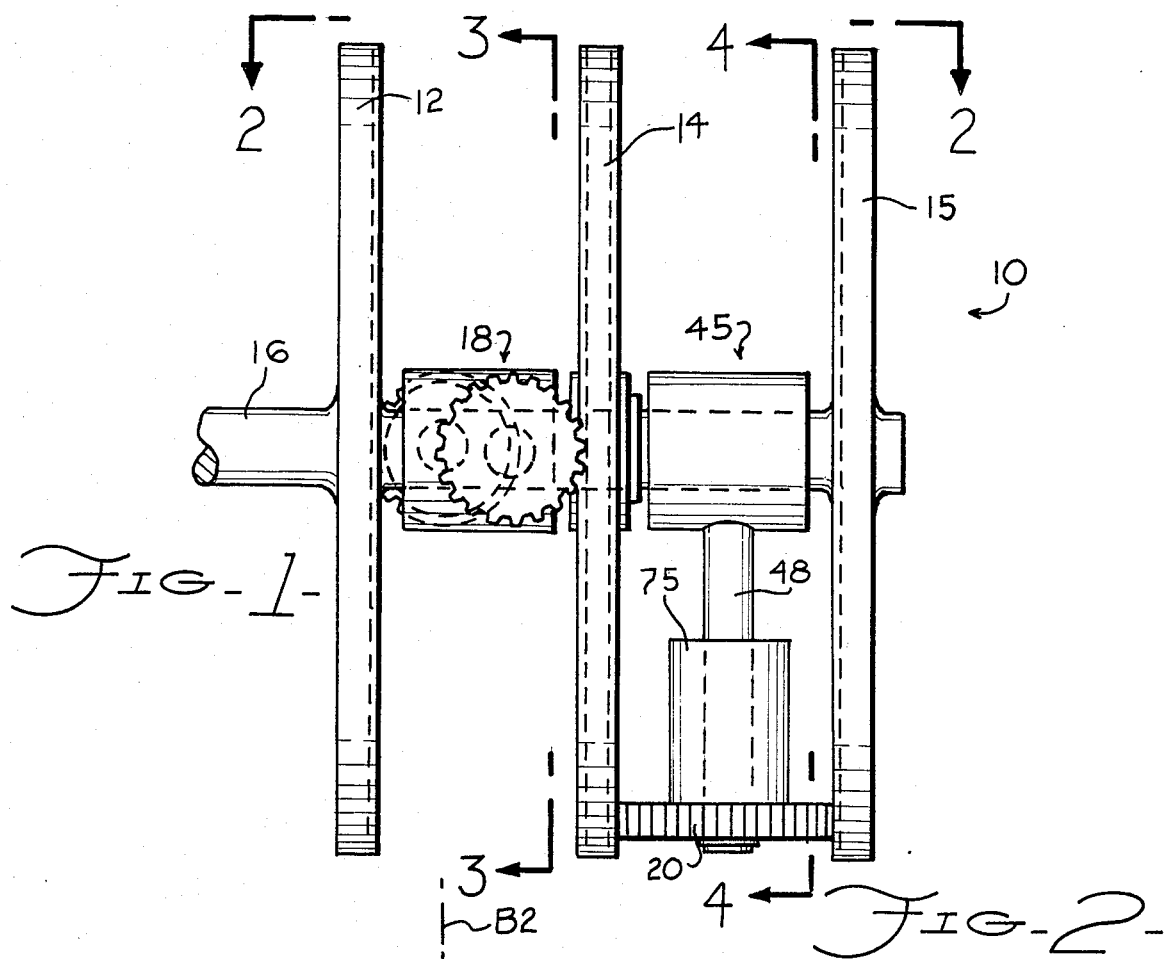
FIG-1-
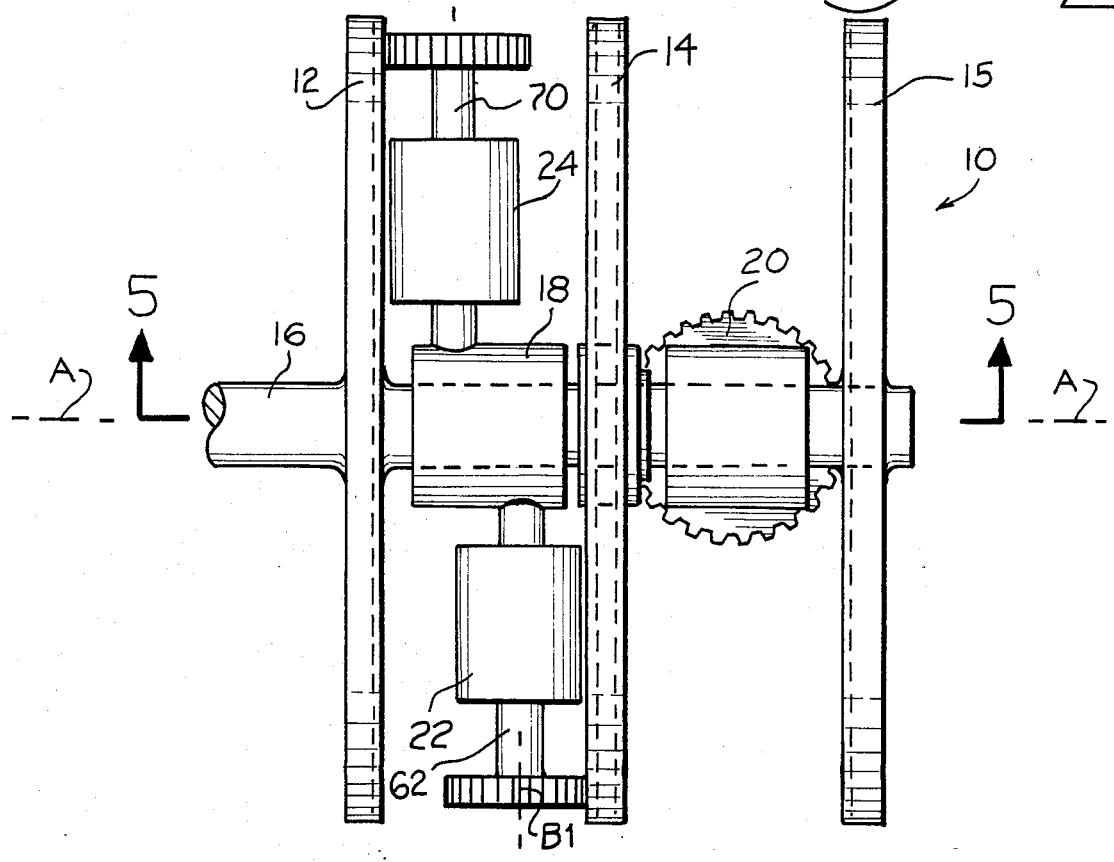
FIG-2-

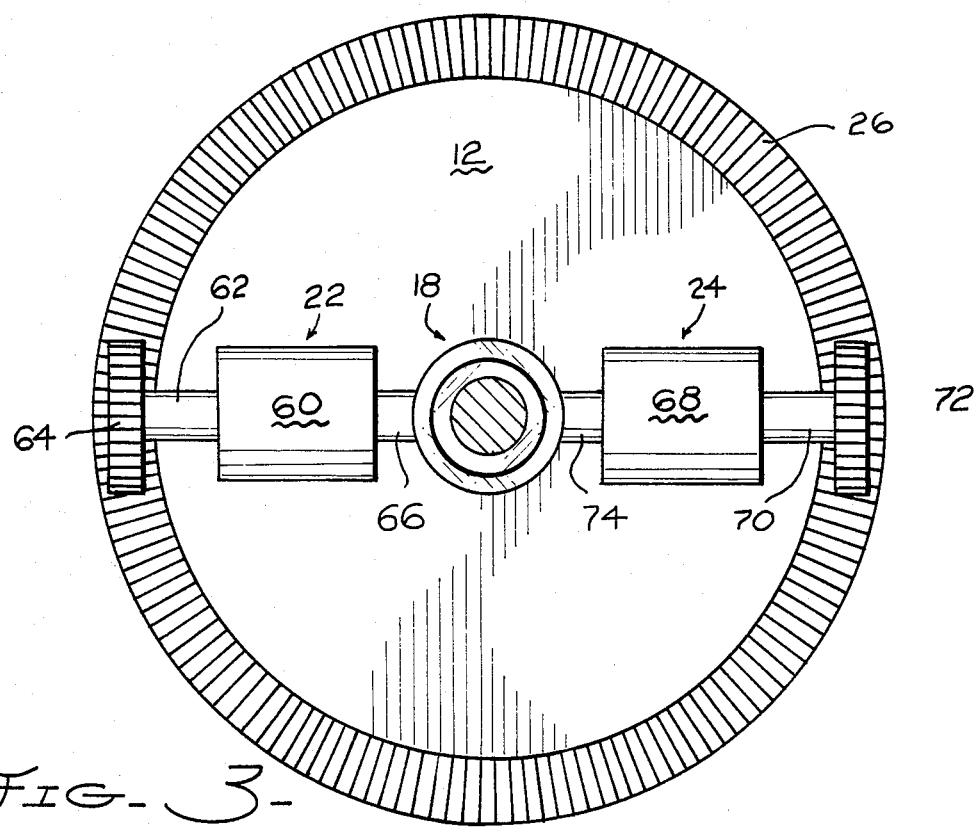
FIG-3-
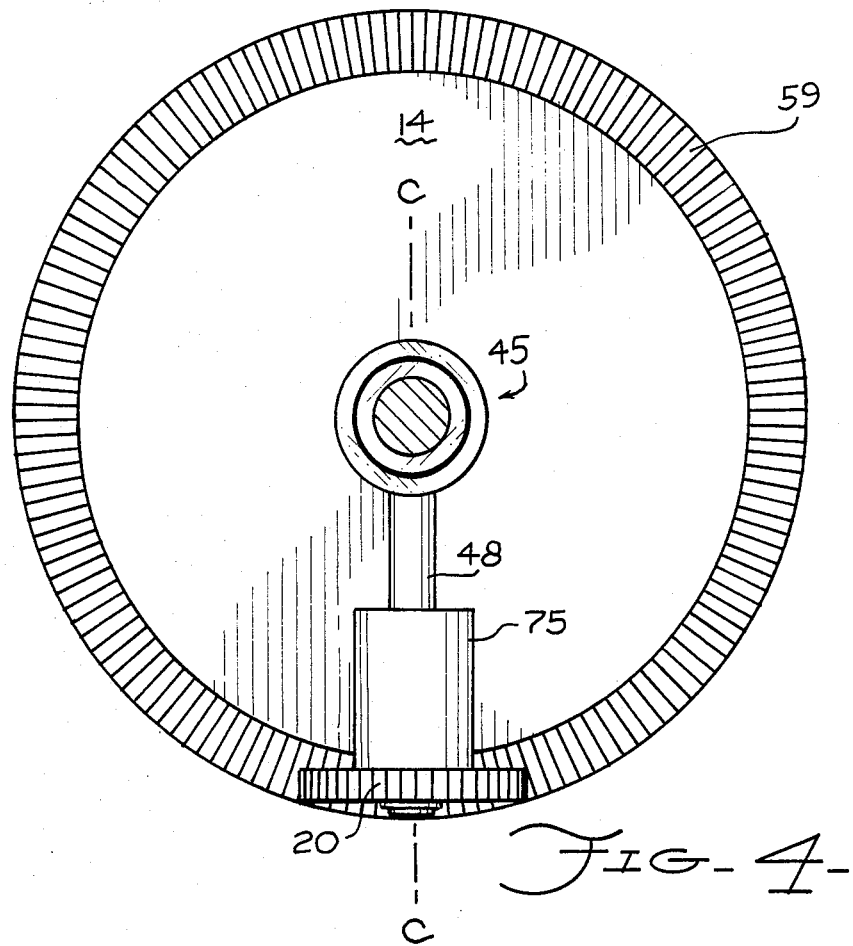
FIG-4-

GENERATOR ASSEMBLY WITH TORQUE BALANCING GENERATION

BACKGROUND OF THE INVENTION

1. Field of the Invention

This invention relates generally to electric generators, and more particularly to generators supported by a pendulum arm and powered by rotating disk.

2. Description of the Prior Art

There are many applications in which it is desirable to generate small amounts of electrical power from a rotating member. For example, there are many patents in the prior art which teach methods and apparatus for generating energy from the rotation of a car or bicycle wheel.

In U.S. Pat. No. 4,229,728 of Tremba, a hubcap generator is disclosed including a permanent magnet attached to a weighted pendulum. As a pick-up coil attached to the wheel rotates past the magnet, an electromotive force is imposed on the coil, generating electric power.

In U.S. Pat. No. 4,539,496 Thomas, a generator assembly characterized by a hubcap and an elongated arm attached to a first end to a central portion of the hubcap is disclosed. A generator is attached to the second end of the arm, and engages a surface rotated by the wheel. Due to the generator's offset position, there is a step-up effect of the mechanical power supply to the generator, thus increasing the electrical power developed by the generator.

The generator assemblies of both Tremba and Thomas produce a very limited amount of electrical power due to the fact that they tend to rotate with the wheel. With Thomas, the maximum power output for a given generator at a given speed is reached when the coupling force of the rotor is equal to the force required to raise the generator to a horizontal position. When the coupling force exceeds this condition, the generator and wheel will rotate together.

SUMMARY OF THE INVENTION

An object of this invention is to provide a generator assembly for rotatable members which can produce more power from a given generator unit.

Another object of this invention is to produce a generator assembly which is particularly adapted to be supported by a rotating member, such as a wheel.

Briefly, the invention includes three separated, rotatable plates having a common axis of rotation, a support shaft rigidly attached to a first plate and a third plate and rotatably supporting the second plate, a drive gear coupling the second plate to the third plate so that they rotate in opposite directions, and a generator bearing which supports a pair of generators between the first plate and the second plate. The first generator is coupled to the first rotating plate, and the second generator is coupled to the second rotating plate.

An advantage of this invention is that the torques produced by the two generators cancel each other out, producing a net zero torque on the generator support. In consequence, no matter how fast the plates rotate, the support member tends to remain stationary, maximizing the speed differential between generators and the rotating plates.

These and other objects and advantages of the present invention will no doubt become apparent upon a reading of the following descriptions and a study of the several figures of the drawing.

BRIEF DESCRIPTION OF THE DRAWING

FIG. 1 is a side elevation of the present invention;

FIG. 2 is a top plan view taken along line 2—2 of FIG. 1;

FIG. 3 is a view taken along line 3—3 of FIG. 1;

FIG. 4 is a view taken along line 4—4 of FIG. 1; and

DETAILED DESCRIPTION OF THE PREFERRED EMBODIMENT(S)

Figure 5:
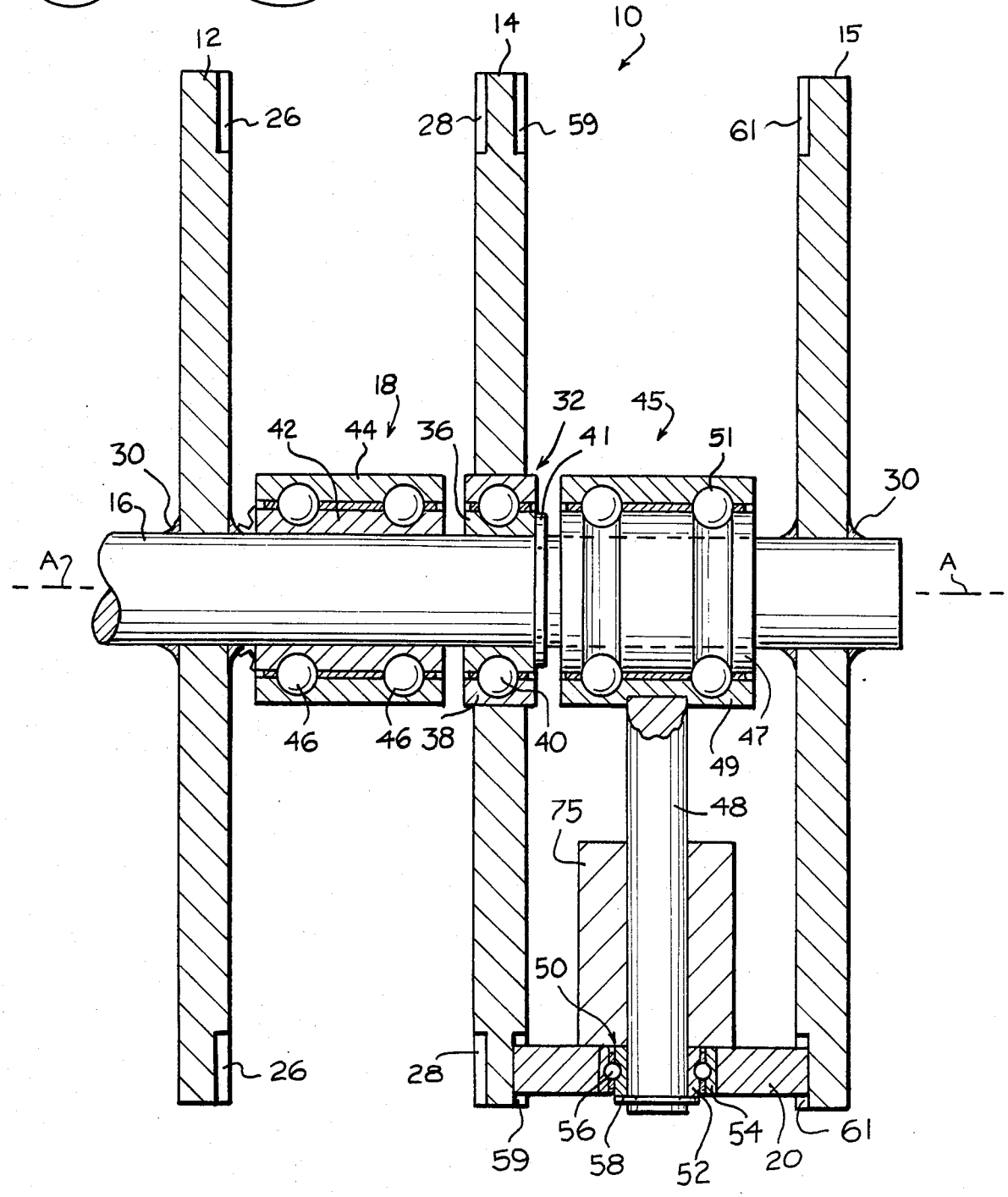
FIG. 5 is an enlarged, cross sectional view taken along line 5—5 of FIG. 2.

Referring generally to the figures, a generator assembly 10 in accordance with the present invention includes a rotatable plate 12, a rotatable plate 14, a rotatable plate 15, a support shaft 16, a generator support bearing 18, a drive gear 20, and a pair of generators 22 and 24. Shaft 16 is coupled to a mechanical power source, such as the shaft of a motor, the hub of a wheel, or any other rotating object.

Referring more specifically to FIGS. 3 and 5, rotatable plate 12 is a flat disk, and is provided with an annular surface gear 26 near its circumference. Rotatable plate 14 is also a flat disk, and is provided with an annular surface gear 28 which faces surface gear 26.

As seen in FIG. 5, plate 12, plate 14, plate 15, shaft 16, generator support bearing 18, and a drive gear bearing 45 are rotatable around a common axis A. Plates 12 and 15 are rigidly attached to shaft 16, such as by weldments 30, and plate 14 is rotatably coupled to shaft 16 by a bearing assembly 32.

Bearing assembly 32 includes an inner race 36 which is attached to and rotates with shaft 16, an outer race 38, and ball bearings 40. The bearing assembly 32 is held in place by a retaining clip 41. Generator support bearing 18 includes an inner race 42, an outer race 44, and a number of ball bearings 46. Thus, the outer race 44 of generator support bearing 18 is free to rotate independently of shaft 16, and plate 14 is also free to rotate independently of shaft 16. Drive gear bearing 45 includes an inner race 47, an outer race 49, and ball bearings 51. The inner race 47 is coupled to shaft 16.

Drive gear 20 is coupled to the outer race 49 of drive gear bearing 45 by a radial shaft 48. Gear 20 is supported on the end of shaft 48 by a bearing assembly 50 including an inner race 52, an outer race 54, and ball bearings 56. Inner race 52 is rigidly coupled to radial shaft 48, and outer race 54 is rigidly attached to gear 20. A retaining clip 58 holds the gear assembly 50 in place.

The teeth of drive gear 20 engage the teeth of a surface gear 59 on plate 14 and the teeth of a surface gear 61 on plate 15. As plate 15 is rotated in one direction by shaft 16, gear 20 will cause plate 14 to rotate in the other direction.

Referring to FIG. 3, generator 22 includes a housing 60, a shaft 62, and a gear 64. The housing 60 is coupled to generator support bearing 18 by a shaft 66. Likewise, generator 24 includes a housing 68, a shaft 70 extending from the housing, and a gear 72 attached to the end of the shaft 70. The housing 68 is coupled to generator support 18 by a shaft 74. The teeth of gear 64 of generator 22 engage the teeth of surface gear 28, and the teeth of gear 72 of generator 24 engage the teeth of surface gear 26.

Located within housings 60 and 68 are stators rigidly coupled to the housings, and rotors coupled to rotatable shafts 62 and 70. Rotation of the shafts 62 and 70 creates relative motion between the rotors and stators to produce electrical energy.

As best seen in FIG. 2, shaft 62 rotates around an axis B1 and shaft 70 rotates around a parallel axis B2. As seen in FIG. 4, shaft 48 is aligned with an axis C. Axes A and B1/B2 are mutually perpendicular, as are axes A and C.

Since plates 12 and 14 are being driven in opposite directions, shafts 62 and 70 will also be driven in opposite directions. Any torque exerted on the generator support bearing 18 by one of the generators would be cancelled by an equal and opposite torque created by the other generator. Thus, the generator support bearing 18 and the generators 22 and 24 tend to stay stationary as the plates 12 and 14 rotate.

Gear 20 tends to hang straight down due to a weight 75 attached to shaft 48. Gear 20 is provided with its own bearing 45 so that its motion is decoupled from the motion of the generator support bearing 18.

While this invention has been described in terms of a few preferred embodiments, it is contemplated that persons reading the preceding descriptions and studying the drawing will realize various alterations, permutations and modifications thereof. It is therefore intended that the following appended claims be interpreted as including all such alterations, permutations and modifications as fall within the true spirit and scope of the present invention.

What is claimed is:

1. A generator assembly comprising:
    three rotatable plates including a first plate, a second plate, and a third plate, said three rotatable plates having a common axis of rotation, said three plates being spaced apart with said second plate located between said first plate and said third plate;
    drive means coupling said three plates together such that said first plate and said third plate rotate in a first direction and said second plate rotates in a second direction opposite said first direction;
    a generator support means disposed between said first plate and said second plate; and
    a pair of generators attached to said generator support means, where a first rotatable member of a first generator is coupled to said first plate, and where a second rotatable member of a second generator is coupled to said second plate.

2. A generator assembly as recited in claim 1 further comprising shaft means affixed to said first plate and said third plate, and wherein said generator support means includes a generator support bearing coupled to said shaft means.

3. A generator assembly as recited in claim 2 further comprising second bearing means coupling said second plate to said shaft means.

4. A generator assembly as recited in claim 3 wherein said drive means includes a drive gear engaging said second plate and said third plate.

5. A generator assembly as recited in claim 4 wherein said drive means further includes a drive gear bearing coupled to said shaft between said second plate and said third plate, a support member attached to said drive gear bearing, and third bearing means coupling said drive gear to said support member.

6. A generator assembly as recited in claim 5 wherein said first generator includes a first stator and a first rotor, wherein said second generator includes a second stator and a second rotor, where said first rotor and said second rotor rotate coaxially but in opposite directions.

7. A generator assembly as recited in claim 6 further comprising a first generator gear coupling said first rotor to said first plate, and a second generator gear coupling said second rotor to said second plate.

8. A generator assembly as recited in claim 7 further comprising a first surface gear provided on a surface of said first plate, and a second surface gear provided on a facing surface of said second plate, a third surface gear provided on the other surface of said second plate, and a fourth surface gear provided on a facing surface of said third plate, where said first generator gear engages said first surface gear, said second generator gear engages said second surface gear, and said drive gear engages both said third and fourth surface gears.

9. A torque balancing generator assembly comprising:
    a pair of spaced apart plates rotatable about a common axis;
    shaft means whereupon a first plate of said pair of plates is affixed and a second plate of said pair of plates is rotatably supported;
    means for rotating said first plate in a first direction and said second plate in a second direction which is opposite said first direction; and
    a pair of generators rotatably supported by said shaft means, where a first generator is driven by said first plate and said second generator is driven by said second plate, each generator extending in a direction perpendicular to said shaft means and opposite the other generator.

10. A generator assembly as recited in claim 9 wherein said shaft means comprises a support shaft affixed to said first member and rotatably supporting said second member.

11. A generator assembly as recited in claim 10 further comprising generator bearing means coupling said pair of generators to said support shaft.

12. A generator assembly as recited in claim 11 further comprising rotatable member bearing means coupling said second member to said support shaft.

13. A generator assembly comprising:
    a support shaft;
    a first rotatable member affixed to said support shaft;
    a second rotatable member, and a first bearing means, said second rotatable member rotatably coupled to said support shaft by said first bearing means, said first and second members being spaced-apart for coaxial alignment;
    means for rotating said first member in a first direction and said second member in a second direction which is opposite said first direction;
    a pair of generators and a second bearing means, where a first generator is driven by said first member and a second generator is driven by said second member, said pair of generators coupled to said support shaft by said second bearing means; and
    a third member affixed to said support shaft such that said second member is between said first member and said third member, and a drive wheel coupling said third member to said second member.

14. A generator assembly as recited in claim 13 wherein said drive wheel is supported on said shaft by a drive wheel bearing.

15. A generator assembly as recited in claim 14 further comprising a drive wheel shaft coupling said drive wheel to said drive wheel bearing, and a weight coupled to said drive wheel shaft.

* * * * *